United States Patent
Shen et al.

(10) Patent No.: US 7,842,147 B2
(45) Date of Patent: Nov. 30, 2010

(54) COMPOSITE PANEL HAVING IN-SITU THERMOSET FOAMED CORE

(75) Inventors: Hongbin Shen, Xiangfan (CN); Phu Nguyen, Fountain Valley, CA (US); Matthew Lowry, Orange, CA (US)

(73) Assignee: M.C. Gill Corporation, El Monte, CA (US)

(*) Notice: Subject to any disclaimer, the term of this patent is extended or adjusted under 35 U.S.C. 154(b) by 898 days.

(21) Appl. No.: 11/669,836

(22) Filed: Jan. 31, 2007

(65) Prior Publication Data

US 2008/0182067 A1 Jul. 31, 2008

(51) Int. Cl.
*B32B 37/00* (2006.01)
(52) U.S. Cl. .............................. 156/83; 156/78; 156/79; 156/256; 156/292
(58) Field of Classification Search .................... 156/78, 156/79, 83, 256, 250, 292, 290
See application file for complete search history.

(56) References Cited

U.S. PATENT DOCUMENTS

| | | | |
|---|---|---|---|
| 3,170,827 A * | 2/1965 | Voelker ....................... | 156/78 |
| 3,176,387 A * | 4/1965 | Argueso, Jr. et al. .......... | 29/423 |
| 3,990,936 A | 11/1976 | Geschwender | |
| 4,330,494 A * | 5/1982 | Iwata et al. ................... | 156/79 |
| 4,945,268 A | 7/1990 | Nihei | |
| 5,484,500 A | 1/1996 | Kaufmann | |
| 5,660,901 A | 8/1997 | Wong | |
| 5,783,272 A | 7/1998 | Wong | |
| 6,309,732 B1 | 10/2001 | Lopez-Anido | |
| 6,387,200 B1 | 5/2002 | Ashmead et al. | |
| 6,456,996 B1 | 9/2002 | Crawford | |
| 6,630,221 B1 | 10/2003 | Wong | |
| 6,635,202 B1 | 10/2003 | Bugg et al. | |
| 6,770,349 B2 | 8/2004 | Itoh et al. | |
| 2002/0022094 A1 | 2/2002 | Sherwood | |
| 2003/0020195 A1 | 1/2003 | Webster | |
| 2004/0028877 A1 | 2/2004 | Itoh et al. | |

(Continued)

FOREIGN PATENT DOCUMENTS

| | | | |
|---|---|---|---|
| EP | 1184130 | * | 3/2002 |
| EP | 1295713 A1 | * | 3/2003 |
| JP | 3-251329 A | * | 11/1991 |

OTHER PUBLICATIONS

International Search Report and The Written Opinion of the International Searching Authority, or the Declaration in PCT/US2008/052403, dated Jun. 30, 2008.

*Primary Examiner*—Jeff H Aftergut
(74) *Attorney, Agent, or Firm*—Denton L. Anderson; Sheldon Mak & Anderson PC

(57) ABSTRACT

A method for making a composite panel, wherein the composite panel has a honeycomb core sandwiched between a pair of facing sheets, includes the steps of (a) coating the interior walls of the cells with a unexpanded thermo-expandable material; (b) bonding a pair of facing sheets to the opposite sides of the honeycomb core; and (c) heating the honeycomb core while the honeycomb core is sandwiched between the pair of facing sheets with sufficient heat to cause the thermo-expandable material to expand and to substantially fill the cells.

2 Claims, 2 Drawing Sheets

U.S. PATENT DOCUMENTS

| | | |
|---|---|---|
| 2004/0235996 A1 | 11/2004 | Shah et al. |
| 2004/0253407 A1 | 12/2004 | Shah et al. |
| 2005/0013982 A1 | 1/2005 | Burgueno et al. |
| 2005/0281999 A1 | 12/2005 | Hofmann et al. |
| 2006/0046019 A1 | 3/2006 | Wang et al. |
| 2006/0083892 A1 | 4/2006 | Wang et al. |

* cited by examiner

COMPOSITE PANEL HAVING IN-SITU THERMOSET FOAMED CORE

FIELD OF THE INVENTION

This invention is directed generally to composite panels and, more specifically, to composite panels having a foamed honeycomb core.

BACKGROUND

Composite panels are widely used as flooring, walls and partition materials in the construction of airplanes due to such composite panels' lightness of weight and bending resistance.

Typically, composite panels comprise a thick sheet of honeycomb core sandwiched between a pair of facing sheets. The honeycomb core is commonly made from an aluminum foil or a paper material and comprises an array of closely-packed hollow channels which are typically hexagonal, square or circular in shape.

The honeycomb core is often filled with a foam material such as polyurethane foam to achieve enhanced physical properties. The hollow structure of a honeycomb core typically accommodates significant amounts of air through which heat and noise can transmit across the panel thickness. Thus, filling the cells of the honeycomb core with foam improves the thermal and acoustic insulation of the composite panel. Elimination of hollow spaces within the honeycomb core also reduces the chances of moisture accumulation and internal corrosion. Furthermore, to various extents, depending on the foam filling density, the filled honeycomb core has higher mechanical strength against compressive, shear and impact forces than does a similar, unfilled honeycomb core.

In some methods of the prior art, the honeycomb core is pre-filled with foam prior to the assembly of the honeycomb core between the facing sheets. In related prior art methods, a thick honeycomb core block (from which multiple honeycomb cores can be cut) is pre-filled with foam prior to the block being cut up into individual honeycomb cores. Unfortunately, such a method of pre-filling the honeycomb core with foam typically results in uneven foam density along the height of the honeycomb cells, i.e., the direction of foam growth inside the honeycomb cell. Moreover, a slice of honeycomb pre-filled with foam is frequently found to be difficult to bond to, because foam debris easily contaminates the honeycomb cell edge, causing weak adhesion.

In other core foaming methods, dry particulate foam precursors are disposed loosely within the cells of the honeycomb core. After a panel precursor is assembled, the panel precursor is heated to cause the particulate foam precursors to create a foam within the cells of the honeycomb core. Unfortunately, in the deposition process, it is difficult to uniformly distribute the particulates over all the honeycomb cells. As a result, the quality of the resulting foam is inconsistent. Moreover, the method of using dry particulate foam precursor materials cannot be adapted for use in a thick honeycomb core block. Still further, operations involving a large quantity of dry particulates are unsafe and a nuisance to operations personnel.

Finally, the foam filling methods of the prior art are typically unable to deliver foam densities lower than about 2 pounds per cubic foot. This is unfortunate because, in applications where thermal and/or acoustic insulation is desired, low density foam filling (preferably lower than 1 pounds per cubic foot) would be ideal.

Accordingly, there is a need for a new method of manufacturing a foam-filled composite panel which avoids the above-described problems in the prior art.

SUMMARY

The invention satisfies this need. The invention is a method for making a composite panel having a honeycomb core sandwiched between a pair of facing sheets. The honeycomb core comprises a pair of opposed sides and a plurality of contiguous cells with interior walls. The method comprises the steps of (a) coating the interior walls of the cells with an unexpanded thermo-expandable material; (b) bonding a pair of facing sheets to the opposite sides of the honeycomb core; and (c) heating the honeycomb core while the honeycomb core is sandwiched between the pair of facing sheets with sufficient heat to cause the thermo-expandable material to expand and to at least partially fill the cells.

DRAWINGS

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figure 1:
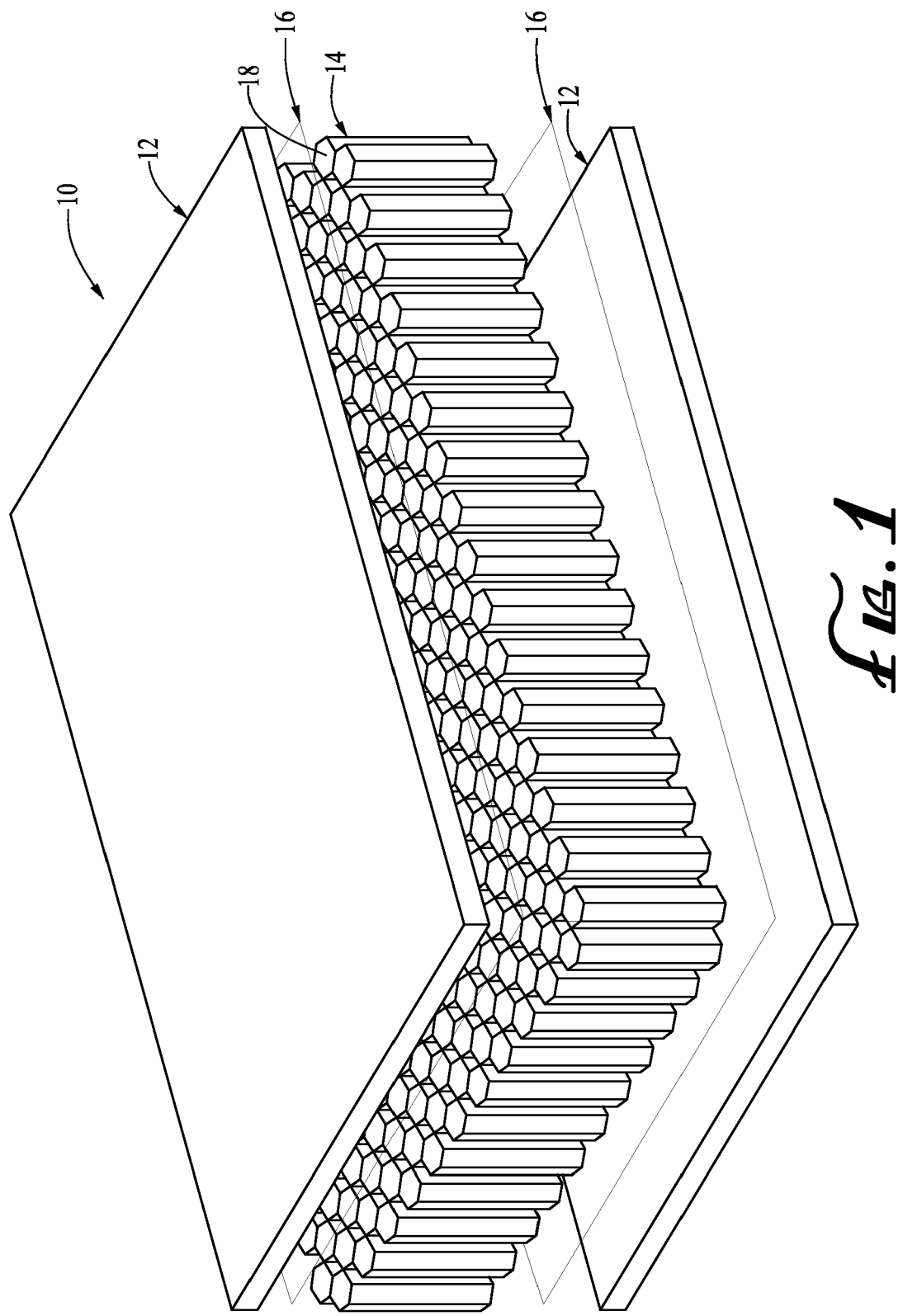
FIG. 1 is a perspective view of a typical composite panel to which the invention is directed.

The invention is a method for making a composite panel 10 such as illustrated in FIG. 1. The composite panel 10 comprises a pair of opposed facing sheets 12, a honeycomb core 14 disposed between the two facing sheets 12 and an expanded thermo-expandable material disposed within the honeycomb core 14. Typically, the facing sheets 12 and the honeycomb core 14 are bonded with an adhesive layer 16. The adhesive layer 16 is typically made of thermoset polymers such as epoxies, phenolics, bismaleimides and cyanoacrylates, or made of hot meltable plastics such as polyamides, polyolefins, polyamides and polyurethanes.

The method comprises the steps of (a) coating the interior walls of the cells 18 within the honeycomb core 14 with an unexpanded thermo-expandable material; (b) bonding a pair of facing sheets 12 to the opposite sides of the honeycomb core 14; and (c) heating the honeycomb core 14 while the honeycomb core 14 is sandwiched between the pair of facing sheets 12 with sufficient heat to cause the thermo-expandable material to expand and to at least partially fill the cells 18.

The facing sheets 12 are typically made from a thin, lightweight material such as metal sheets or fiber reenforced plastics. The facing sheets 12 typically have a thickness between about 0.1 mm and about 3 mm. The adhesive layer 16 is typically very thin, with a thickness between about 0.02 mm and about 0.1 mm.

The honeycomb core 14 comprises a plurality of contiguous linear hollow cells 18 disposed in closely packed parallel relationship with one another. The cells 18 within the honeycomb core 14 are typically hexagonal, rectangular or circular in cross-section, but other cross-sectional shapes can also be used. Typically, the cross-section of each cell 18 defines an area with the maximum edge-to-edge distance of between about 3 mm and about 20 mm.

The honeycomb core 14 is typically made from a lightweight material such as aluminum foil or paper. An aramid paper impregnated with a phenolic resin is commonly used for the honeycomb core 14.

Typically, the honeycomb core 14 has a thickness between about 6 mm and about 50 mm, depending upon the application of the composite panel 10 in which the honeycomb core 14 is used. It is also typical for the honeycomb core 14 to have a density between about 32 kg/m$^3$ and about 140 kg/m$^3$.

The coating of the interior walls of the elongate cells 18 within the honeycomb core 14 can be accomplished using a foam precursor comprising a thermo-expandable material, a polymer binder and a carrier liquid.

The unexpanded thermo-expandable material is chosen to be compatible with the temperatures used in the preparation of the composite panel 10. Moreover, the unexpanded thermo-expandable material is one which is insoluble in the carrier liquid and is compatible with the polymer binder. In one embodiment, the unexpanded thermo-expandable material comprises plastic microballoons. One suitable unexpanded thermo-expandable material is marketed by Expancel Inc. U.S. of Duluth, Ga., as Expancel® 009DU80 or Expancel® 093DU120.

The polymer binder is typically a phenolic resole, epoxy or acrylic.

Typically, the ratio of the thermo-expandable material to the polymer binder is between about 10:1 and about 2:1. Typically, the carrier liquid is water. Typically, the carrier liquid comprises greater than about 70% by weight of the foam precursor. The foam precursor preferably also comprises an anti-settling agent, a surfactant and a fire retardant additive.

The coating of the interior walls of the cells 18 of the honeycomb core 14 can be accomplished by coating the interior walls of the cells 18 within a honeycomb block 20 with an expanded thermo-expandable material, and then slicing the honeycomb block 20 along a plane substantially perpendicular to the longitudinal axes of the cells 18 within the block to create a honeycomb core 14 having coated interior walls.

Figure 2:
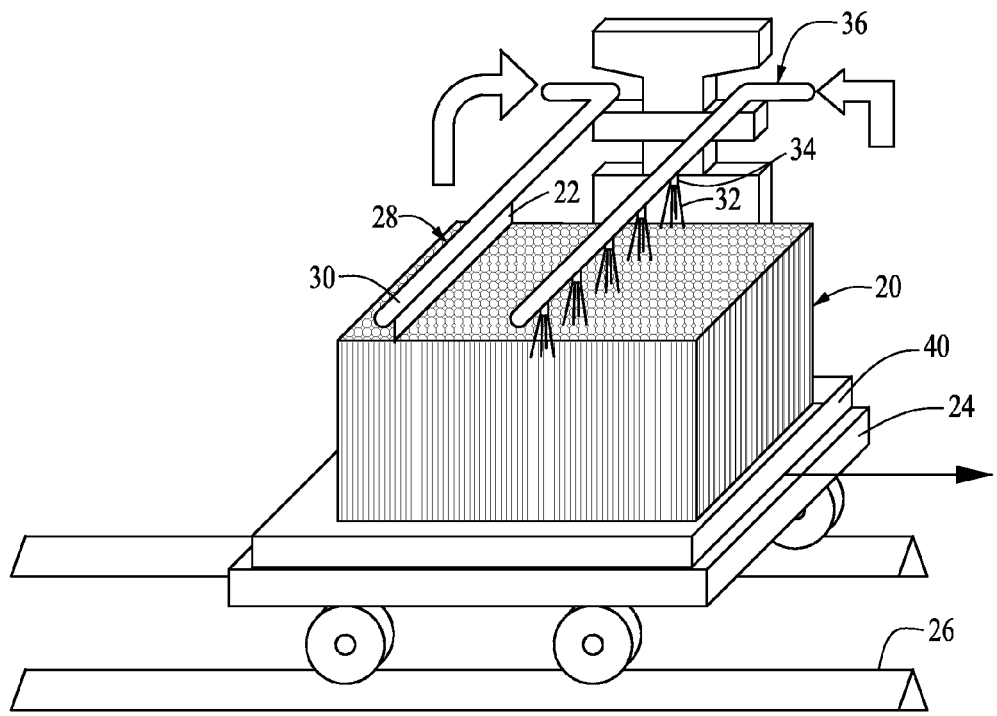
FIG. 2 is a perspective, diagrammatic view of a method of coating the interior walls of a honeycomb block to produce honeycomb cores useful in the invention.

One method of coating the interior walls of the cells 18 in the honeycomb core 14 is illustrated in FIG. 2. This method comprises the step of moving the honeycomb block 20 through a downwardly cascading waterfall 22, wherein the waterfall 22 comprises the foam precursor. As illustrated in FIG. 2, the moving of the honeycomb block 20 through the downwardly cascading waterfall 22 can be accomplished by disposing the honeycomb block 20 on a wheeled cart 24 disposed upon a pair of opposed rails 26. The waterfall 22 of foam precursor is provided by an incoming precursor header 28 having a slotted terminus 30 disposed above the rails. Excess foam precursor is captured in a catch tray 40. Typically, excess foam precursor is blown downwardly and out of the cells 18 by a compressed gas 32, such as compressed air, blowing through downwardly disposed nozzles 34 in the terminus of a compressed gas header 36 located downstream of the incoming foam precursor header 28.

Figure 3:
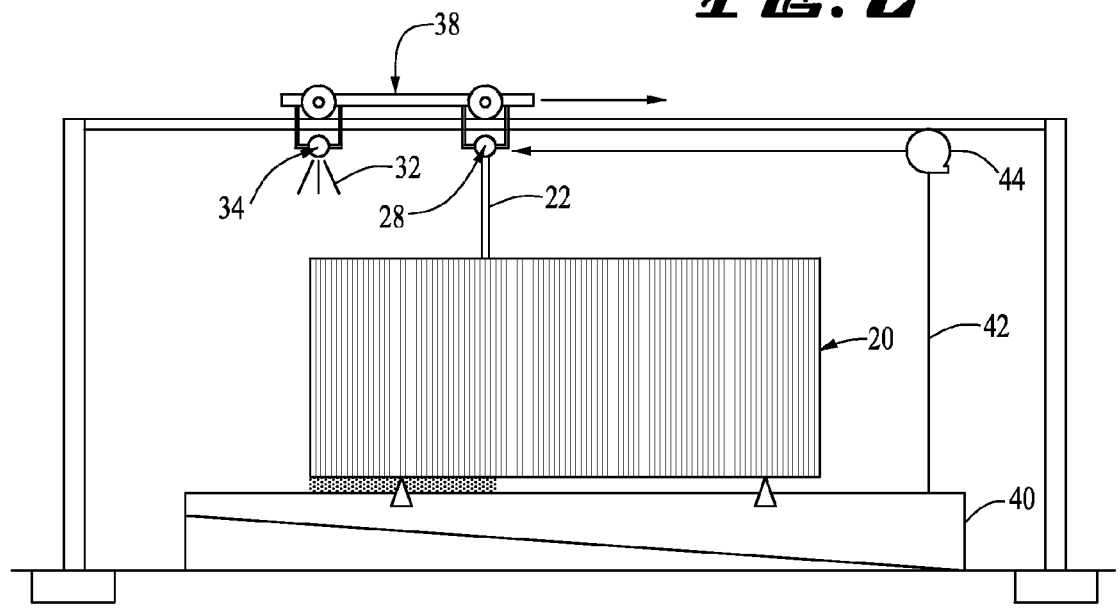
FIG. 3 is a diagrammatic view of an alternative method of coating the interior walls of the honeycomb block to produce honeycomb cores useful in the invention.

FIG. 3 illustrates an alternative method of coating the interior walls of the cells 18 and the honeycomb core 14. In this alternative method, the honeycomb block 20 is held stationary while the downwardly cascading waterfall 22 is moved laterally with respect to the honeycomb core 14 by an overhead crane 38. Also mounted on the crane 38 are downwardly disposed nozzles 34 which blow a compressed gas 32 downwardly into the honeycomb block 20 to blow out excess foam precursor from the cells 18. In the method illustrated in FIG. 3, excess foam precursor is captured in a catch tray 40 disposed below the honeycomb block 20 and is recycled to the incoming foam precursor via a recycle line 42 and a recycle pump 44.

After the walls of the cells 18 are contacted with the foam precursor, the carrier liquid is removed by evaporation and the remainder of the foam precursor is caused to cling to the interior walls of the cell as a solid residue because of the polymer binder. This residue must be sufficiently adherent to the interior walls of the cell so as to not be displaced during subsequent handling of the honeycomb core 14. The binder polymer is chosen, however, such that the unexpanded thermo-expandable material can freely expand when sufficiently heated.

Typically, the amount of foam precursor retained on the cell walls is controlled by adjusting the precursor coating formulation. Alternatively, if a higher amount of coating is desired, the above described coating-drying cycle can be repeated on the same honeycomb block 20.

After the interior walls of the cell of the honeycomb core 14 are coated with the expanded thermo-expandable material, the pair of opposed facing sheets 12 are bonded to opposite sides of the honeycomb core 14, and the honeycomb core 14 is heated while the honeycomb core 14 remains sandwiched between the pair of facing sheets 12. The heat must be sufficient to cause the thermo-expandable material to expand and to at least partially fill the cells 18 within the honeycomb core 14.

The cells 18 of the honeycomb core 14 are typically substantially filled with foam from the thermo-expandable material. However, in certain applications, the amount of unexpanded thermo-expandable material can be adjusted to result in the cells 18 of the honeycomb core 14 being merely partially filled. The partial filling of the honeycomb core 14 with foam can result in a foam density between about 6 kg/m$^3$ and about 10 kg/m$^3$. The substantially complete filling of the cells 18 of the honeycomb core 14 can result in a foam density between about 10 and 100 kg/m$^3$.

The bonding of the facing sheets 12 to the honeycomb core 14 and the heating of the honeycomb core 14 to cause the thermo-expandable material to expand can be accomplished in separate steps or they can be accomplished in a single operation.

Where the bonding of the facing sheets 12 to a honeycomb core 14 and the heating of the honeycomb core 14 to cause the thermo-expandable material to expand are accomplished in separate steps, a composite panel precursor is created by the bonding of the pair of facing sheets 12 to opposite sides of the honeycomb core 14 having a foam precursor bonded to the interior walls of the cells 18 within the honeycomb core 14. Where the facing sheets 12 comprise a fiber reenforced plastic, fibrous reenforcements impregnated with thermoset resins ("prepregs") are typically used, and the adhesion of the facing sheets 12 to the honeycomb core 14 can be achieved by curing the resin in the prepregs or by the use of adhesives, such as polyamide or epoxy adhesives. Where the facing sheets 12 are made of metal, an adhesive layer typically is used to bond the facing sheets 12 to the honeycomb core 14.

Such composite panel precursor can be conveniently shipped from the manufacturer to an end user, whereupon the end user can convert the composite panel precursor into a finished composite panel 10 of the invention by heating the honeycomb core 14 in situ, while the honeycomb core 14 is disposed within the composite panel precursor.

The composite panels 10 of the invention can be easily modified to meet government standards such as the standards set forth in Federal Aviation Regulation ("FAR") 25, Appendix F, Parts I, IV and V.

Unlike composite panels of the prior art, composite panels 10 of the invention are provided with syntactic foam having a very low density (e.g., about 1 pound per cubic foot), wherein prior art syntactic foams typically are 5 pounds per cubic feet or more.

The composite panel 10 of the invention displays many other advantageous properties over traditional composite panels without foam filling. In the composite panel 10 of the invention, thermal insulation is typically improved by 20%-40% over similar composite panels of the prior art. Also, acoustic insulation is typically improved over similar composite panels without foam filling by 2 dB or above over a wide range of noise frequencies. Still further, a relatively dense foam filling (greater than 1 pcf), composite panels 10 of the invention show improved mechanical performances over similar prior art composite panels, particularly in compression strength, shear strength and impact resistance.

EXAMPLE

A composite panel of the invention was created in the manner set forth below.

First, a foam precursor was created by mixing 1835 grams of Expancel® 093DU120 microballoons with 340 grams of butyl cellusolve, 100 grams of anti-settling agent, 548 grams of water soluble phenolic resin and 7485 grams of water. The foam precursor had an initial viscosity of 50 cps.

The foam precursor was applied to a honeycomb block using a waterfall application method similar to that which is illustrated in FIG. 2. The honeycomb block measured 17 inches by 20 inches by 14 inches thick. After passing back and forth through the waterfall several times, the honeycomb block became saturated with the foam precursor. Thereafter, excess foam precursor was blown out of the honeycomb block with compressed air. The wet honeycomb block was then dried within an air hood for 2 hours and further dried for about an hour inside an oven with circulating hot air at a temperature of about 220° F. The dried honeycomb block was about 1040 grams heavier than before being coated, a 28% increase relative to the honeycomb block's original weight.

The dried (and coated) honeycomb block was then subjected to various kinds of vibrational/shaking forces, only to see negligible weight loss. The coated honeycomb block was also shipped across the country by truck transportation, and little weight change was observed.

Thereafter, the coated honeycomb core block was sliced into thin honeycomb core sheets of varying thicknesses with a horizontal band saw. Close examination of the honeycomb core sheets revealed that the coating of the unexpanded thermo-expandable material was consistent throughout the original coated honeycomb core.

A composite panel was made with a one-half-inch-thick honeycomb core sheet cut from the coated honeycomb block. Facing sheets made from woven glass cloth which had been richly impregnated with phenolic resin were applied to both sides of the honeycomb core. No additional adhesive was employed. The resulting composite panel precursor was then pressed under 100 psi pressure at 320° F. for one hour. The panel was then slowly cooled to room temperature.

The resulting composite panel was fully filled with foam. The panel had a thermal conductivity coefficient of 0.022 Btu/hour×ft.×degree F. The OSU Heat Release test on the panel showed the Peak Heat Release Rate to be 55 kW/$m^2$ and the Total Heat Release in two minutes to be 53 kW×min/$m^2$.

Having thus described the invention, it should be apparent that numerous structural modifications and adaptations may be resorted to without departing from the scope and fair meaning of the instant invention as set forth hereinabove.

What is claimed is:

1. A method for making a composite panel having a honeycomb core sandwiched between a pair of facing sheets, the honeycomb core comprising a pair of opposed sides and a plurality of contiguous cells with interior walls, the method comprising the steps of:
   (a) coating the interior walls of the cells with an unexpanded thermo-expandable material by coating interior walls of elongate cells within a honeycomb block with a unexpanded thermo-expandable material and then slicing the honeycomb block along a plane substantially perpendicular to longitudinal axes of the cells within the block to create a honeycomb core having coated interior walls;
   (b) bonding a pair of facing sheets to the opposite sides of the honeycomb core; and
   (c) heating the honeycomb core while the honeycomb core is sandwiched between the pair of facing sheets with sufficient heat to cause the thermo-expandable material to expand and to at least partially fill the cells.

2. The method of claim 1 wherein the step of bonding an exterior sheet to the opposite sides of the honeycomb core and the step of heating the honeycomb core to cause the thermo-expandable material to expand and substantially fill the cells are both accomplished in a single operation.

\* \* \* \* \*

UNITED STATES PATENT AND TRADEMARK OFFICE
CERTIFICATE OF CORRECTION

PATENT NO. : 7,842,147 B2  
APPLICATION NO. : 11/669836  
DATED : November 30, 2010  
INVENTOR(S) : Shen et al.

Page 1 of 1

It is certified that error appears in the above-identified patent and that said Letters Patent is hereby corrected as shown below:

Under column 1, toward the end of the paragraph which begins "Typically, composite panels comprise", at line 20, please change "square" to "rectangular."

Under column 2, toward the end of the paragraph which begins "The invention is a method for making a composite panel 10," at line 49, please change "such as polyamides, polyolefins, polamides and polyurethanes" to "such as polyamides, polyolefins, polyimides and polyurethanes."

Signed and Sealed this  
Eighth Day of February, 2011

David J. Kappos  
*Director of the United States Patent and Trademark Office*